United States Patent [19]

Horwitz et al.

[11] Patent Number: 5,368,736
[45] Date of Patent: Nov. 29, 1994

[54] PROCESS FOR THE SEPARATION AND PURIFICATION OF YTTRIUM-90 FOR MEDICAL APPLICATIONS

[75] Inventors: Philip E. Horwitz, Naperville; Mark L. Dietz, Evanston, both of Ill.

[73] Assignee: The United States of America as represented by the United States Department of Energy, Washington, D.C.

[21] Appl. No.: 95,555

[22] Filed: Jul. 26, 1993

[51] Int. Cl.$^5$ ............................................. B01D 15/08
[52] U.S. Cl. ..................... 210/635; 210/656; 423/2; 423/21.1; 423/21.5; 423/155; 423/157
[58] Field of Search ............... 423/2, 21.1, 155, 157, 423/21.5; 210/635, 656, 659, 198.2

[56] References Cited

U.S. PATENT DOCUMENTS

| | | | |
|---|---|---|---|
| 3,706,689 | 12/1972 | Haskins | 423/2 |
| 3,925,062 | 12/1975 | Trombe | 423/21.1 |
| 4,387,077 | 6/1983 | Weterings | 423/21.1 |
| 4,548,790 | 10/1985 | Horwitz et al. | 423/9 |
| 4,835,107 | 5/1989 | Horwitz et al. | 436/82 |
| 5,023,061 | 6/1991 | Snyder | 423/2 |
| 5,039,336 | 8/1991 | Feuling | 423/21.1 |
| 5,045,209 | 9/1991 | Snyder | 210/656 |
| 5,049,363 | 9/1991 | Feuling | 423/21.1 |
| 5,100,585 | 3/1992 | Horwitz et al. | 252/631 |
| 5,110,474 | 5/1992 | Horwitz et al. | 210/635 |
| 5,169,609 | 12/1992 | Horwitz et al. | 423/10 |
| 5,266,282 | 11/1993 | Delloye | 423/21.5 |

OTHER PUBLICATIONS

Appl. Radiat. Isot. vol. 43, No. 9 pp. 1093–1101, Sep. 1992, Improved Chemistry for the Production Yttrium-90 for Medical Applications, Dietz et al.
Radiokhimiya, vol. 32, No. 6 pp. 61–66, Nov.–Dec. 1990, Isolation of $^{87}$Y from Sr Targets Irradiated in a Cyclotron and Preparation of a $^{87m}$Sr Generator—Yu. G. Sevastyanov, A. A. Razbash, and A. G. Maklachlov—UDC 541.15 (p. 619).
Journal of Radioanalytical Chemistry, vol. 64, No. 1–2 (1981) 257–265, The Preparation of A Rubidium-82 Radionuclide Generator—P. O. Horlock, J. C. Clark, I. W. Goodier, J. W. Barnes, G. E. Bentley, P. M. Grant, H. A. O Brien—(p. 257).
Appl. Radiat. Isot., vol. 41 No. 9 pp. 861–865, 1990, Chemistry for Commercial Scale Production of Yttrium-90 for Medical Research, J. S. Wike, et al.
The Journal of Nuclear Medicine, vol. 32, No. 2, Feb. 1991-Newsline—pages, Yttrium-90, for Cancer Therapy Studies Secured Through Government & Commerical Suppliers, (4 pages—16N–19N).

*Primary Examiner*—Ernest G. Therkorn
*Attorney, Agent, or Firm*—Mark P. Dvorscak; Robert J. Fisher; William R. Moser

[57] ABSTRACT

An extraction chromatographic method for the preparation of $^{90}$Y of high chemical and radiochemical purity is disclosed. After an initial purification of a $^{90}$Sr stock solution and a suitable period of $^{90}$Y ingrowth, the solution is passed through a series of strontium-selective chromatographic columns, each of which lowers the $^{90}$Sr content of the mixture by a factor of about $10^3$. The $^{90}$Y remaining is freed from any residual $^{90}$Sr, from its $^{90}$Zr daughter, and from any remaining impurities by passing the sample through a final column designed to selectively retain yttrium.

8 Claims, 5 Drawing Sheets

PROCESS FOR THE SEPARATION AND PURIFICATION OF YTTRIUM-90 FOR MEDICAL APPLICATIONS

CONTRACTURAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to a process for the separation and purification of curie quantities of yttrium-90, produced from strontium-90 for use in the treatment of cancer and rheumatoid arthritis of the knee joint. More specifically, the invention relates to a process for the separation and purification of yttrium-90 while preserving the purity of the strontium-90 source, and removing other impurities from the yttrium-90.

Considerable effort has recently been directed toward the development of site-specific methods for the treatment of various forms of cancer using radionuclides. The suitability of a given radionuclide for use in such an application is determined by several factors, among them its mode of production, the availability of effective methods for its attachment to a site-specific agent, its potential toxicity if detached from the agent, and its therapeutic effectiveness. These considerations, together with the requirement that the isotope have an appropriate half-life and decay scheme, severely limit the number of radionuclides which may be seriously considered for use in radioimmunotherapy.

Among the more attractive radionuclides for therapeutic applications is yttrium-90. Its relatively short half-life (64.0 h) and maximum beta energy (2.28 MeV) make it well suited for a variety of applications, ranging from the radiolabeling of antibodies for tumor therapy to the production of radiolabeled particles for the treatment of liver malignancies. Yttrium-90 results from the decay of strontium-90 according to the following scheme:

$$^{90}Sr \xrightarrow[28y]{\beta^- (0.54 MeV)} {}^{90}Y \xrightarrow[64.0h]{\beta^- (2.28 MeV)} {}^{90}Zr(stable)$$

Before it can be safely employed in clinical applications, the $^{90}Y$ must be made essentially free of $^{90}Sr$, an isotope known to cause bone marrow suppression. In addition, any trace elements which could interfere with the radiolabeling process by competing with $^{90}Y$ for binding sites must be removed.

Many methods for effecting the separation of $^{90}Y$ and $^{90}Sr$ have been described, among them solvent extraction, ion-exchange, precipitation, and various forms of chromatography. Of these, ion-exchange methods have probably received the most attention. Numerous procedures have been reported, for example, in which a cation exchange resin (e.g. Dowex 50) is used to retain $^{90}Sr$, while the $^{90}Y$ is eluted with an aqueous complexant such as lactate, acetate, citrate, oxalate, or EDTA. Several of these procedures have been proposed as the basis for $^{90}Y$ generator systems. Unfortunately, in each case, the $^{90}Y$ is not eluted in a form suitable for direct labeling of antibodies. That is, often the concentration of the complexing agent is such that it will compete effectively with binding sites on the antibody for the activity, resulting in a decrease in the labeling efficiency. Thus, it usually becomes necessary to either remove these materials prior to antibody labeling or to carry out postlabeling purification. In addition, ion-exchange resins are plagued by a gradual loss of capacity due to radiation damage. As a result, ion-exchange is considered suitable only for subcurie quantities of activity, less than the quantities which often must be processed for clinical applications. Finally, achieving acceptable $^{90}Y$ yields while minimizing $^{90}Sr$ breakthrough often requires the use of long ion-exchange columns and impractically large volumes of eluent.

Kanapilly and Newton (1971) have described a process applicable to the separation of even multi-Ci quantities of $^{90}Y$ from $^{90}Sr$ which overcomes many of the limitations of ion-exchange methods. This process, which involves the precipitation of $^{90}Y$ as the phosphate, however, requires the addition of nonradioactive yttrium as a carrier, yielding a $^{90}Y$ product which is not, obviously, carrier free. More recently, workers at Oak Ridge National Laboratory have introduced a procedure involving an initial solvent extraction of the $^{90}Y$ from a dilute acid solution of $^{90}Sr/^{90}Y$ using his (2-ethylhexyl) phosphoric acid in dodecane. Although good decontamination factors are routinely obtained, the useful life of the generator is limited, as radiolysis products of the extractant employed gradually accumulate in the $^{90}Sr$ stock. Moreover, the complexity of the process, which involves repeated stripping of the initial extractant solution to reduce trace impurities and repeated wet ashing of the stock solution to destroy dissolved organic phosphates, is prohibitive.

U.S. Pat. 5,100,585, and U.S. application Ser. No. 08/076,881 filed Jun. 15, 1993, now U.S. Pat. No. 5,344,623 both assigned to the U.S. Department of Energy, and incorporated herein by reference, describe processes for the recovery of strontium and technetium values from acidic feed solutions containing other fission product values and containing up to 6 molar nitric acid. Recent work patented by the inventors, directed at improving analytical methodology for the determination of actinides and radiostrontium in biological and environmental samples, has led to the development of extraction chromatographic resins capable of selectively sorbing actinides and lanthanides or radiostrontium from nitric acid solution. See, Horwitz et. al, "Method for Liquid Chromatographic Extraction of Strontium from Acid Solutions", U.S. Pat. No. 5,110,474, and Horwitz et. al, "Method for the Concentration and Separation of Actinides from Biological and Environmental Samples", U.S. Pat. No. 4,835,107. The present application discloses the application of these materials to the preparation of $^{90}Y$ of sufficient chemical and radiochemical purity to be suitable for use in medical applications.

Accordingly, it is an object of the present invention to provide a process for the preparation of $^{90}Y$ of sufficient chemical and radiochemical purity to be suitable for use in medical applications.

It is another object of the present invention to provide a process for the separation of $^{90}Y$ from $^{90}Sr$ by selectively separating the $^{90}Sr$ from the $^{90}Y$.

Yet another object of the present invention is to provide a process for the separation of $^{90}Y$ from $^{90}Sr$ which avoids the need to frequently replace the $^{90}Sr$ and the generation of large quantities of radioactive waste.

SUMMARY OF THE INVENTION

The process for the separation and purification of yttrium-90 from a stock solution of strontium-90 involves an initial purification of the $^{90}Sr$ stock solution by dissolving the residue remaining after its evaporation in nitric acid and passing it through an extraction chromatographic column containing a strontium-selective extractant sorbed on an inert polymeric support. Strontium is retained, while decay products and impurities pass through and are discarded. The strontium is then removed from the column with dilute nitric acid. Any traces of organic materials present in this purified $^{90}Sr$ are then removed by passing the solution through a bed of a polymeric sorbent. The $^{90}Sr$ solution is then stored for a sufficient period of time to allow $^{90}Y$ ingrowth to occur in the solution, thus providing a $^{90}Sr/^{90}Y$ mixture. Next, the $^{90}Sr/^{90}Y$ mixture is acidified and passed through a series of strontium-selective chromatographic columns such that essentially all of the $^{90}Sr$ is retained on the columns and the effluent from the third column contains essentially only $^{90}Y$. The $^{90}Y$ effluent is then passed through a rare-earth selective chromatographic column such that $^{90}Y$ is retained, while any residual $^{90}Sr$ is stripped away. Sorbed $^{90}Y$ is then eluted from the rare-earth selective column. Finally, each of the strontium-selective extractant columns is stripped of sorbed $^{90}Sr$ with dilute nitric acid and returning to storage to allow for new $^{90}Y$ growth. The strontium selective extractant resin may be obtained from an octanol solution of di-t-butylcyclohexano-18-crown-6, while the yttrium-selective extractant may be obtained from a solution of octyl(phenyl)-N,N-diisobutylcarbamoylmethylphosphine oxide in tributylphosphate (CMPO in TBP). The various stages of the process are each physically isolated from each other and carried out in individual containment boxes. The total strontium loaded onto the first column typically does not exceed twenty percent of its capacity.

BRIEF DESCRIPTION OF THE DRAWINGS

The above-mentioned and other features of the invention will become more apparent and be best understood, together with the description, by reference to the accompanying drawings, in which.

DESCRIPTION OF THE PREFERRED EMBODIMENTS

Figure 1:
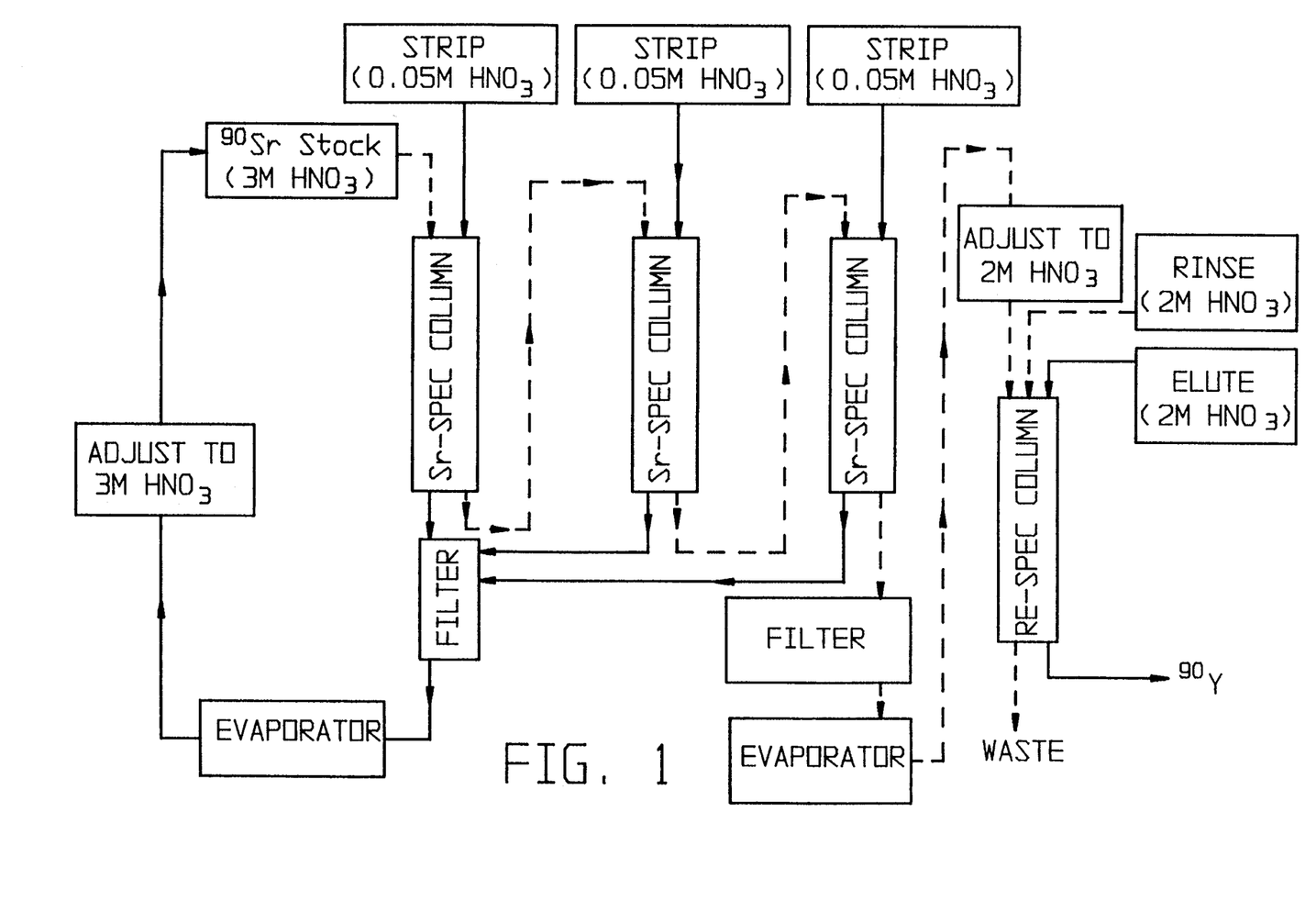
FIG. 1 shows a column arrangement for the isolation of yttrium-90 from strontium-90 stock in accordance with the present invention.

FIG. 1 depicts the basic column arrangement and sequence of steps required to isolate $^{90}Y$ from the original $^{90}Sr$ stock solution. First, a preliminary purification of the $^{90}Sr$ stock is carried out by dissolving the residue remaining after evaporation of the original solution in 3 M nitric acid and passing it through a chromatographic a column containing a strontium-selective extraction chromatographic resin. This resin is prepared with purified Amberchrom CG-71ms resin impregnated with an octanol solution of di-t-butylcyclohexano-18-crown-6 (hereafter abbreviated as DtBuCH18C6). The resultant material, referred to hereafter as Sr•Spec TM column material (for strontium specific), is commercially available from EIChroM Industries, Inc. (Darien, Ill.). Strontium is retained, while any yttrium and zirconium which have accumulated via decay, as well as any impurities initially present, are flushed from the column with several free column volumes of 3 M nitric acid (as shown in FIG. 1) and discarded. The purified strontium is then stripped from the column with dilute (~0.05 M) nitric acid and the solution passed through a bed of uncoated Amberlite XAD-7 resin (Robin & Haas, Philadelphia, Pa.) to remove any traces of organic materials present. The treated solution is then either stored without further treatment or evaporated to dryness. After a suitable period of $^{90}Y$ ingrowth, the $^{90}Sr/^{90}Y$ mixture is acidified to 3 M nitric acid and passed through a series of three Sr•Spec columns in tandem. Essentially all of the strontium present is retained on these columns. Thus, the effluent from the third column contains only $^{90}Y$, any $^{90}Zr$ daughter formed during the growth period, and any adventitious impurities. This effluent is filtered through a bed of Amberlite XAD-7, then taken to dryness. The residue is taken up in the minimum possible volume of 2 M nitric acid and passed through a column of RE•Spec resin. The RE•Spec column is defined as a column containing a yttrium-selective extraction chromatographic resin. This resin is prepared with purified Amberchrom CG-71 ms resin impregnated with a 1 M solution of octyl(phenyl)-N,N-diisobutylcarbamoylmethylphosphine oxide (CMPO) in tributylphosphate (TBP). This material, referred to as RE•Spec TM column material (for rare earth specific) is also available commercially from EIChroM Industries. Here, $^{90}Y$ is retained, while any residual $^{90}Sr$ and most impurities are not. Sorbed yttrium is then eluted from the column with a small volume of nitric acid solution. Finally, each of the Sr•Spec columns is stripped of sorbed 90Sr with dilute (~0.05 M) nitric acid and the strontium returned to storage to allow for new $^{90}Y$ ingrowth.

It is important to point out that in the processing of the quantities of material typically required for clinical applications, the various stages of the process must be physically isolated from one another to minimize the risk of contamination of the final product with $^{90}Sr$. In the arrangement now employed at Argonne National Laboratory for the processing of multi-Ci levels of activity, the initial purification of the $^{90}Sr$ is carried out in one containment box, the tandem Sr•Spec column treatment in a second, and the final $^{90}Y$ concentration and purification in a third. Note that clinical applications require that the $^{90}Y$ product be in an aqueous solution containing $\leq 0.05$ M hydrochloric acid rather than nitric acid, making a cross-over step necessary before final packaging. This is also performed in the third total strontium loaded onto the first column should not exceed 20% of its capacity.

Experimental Results

Elution behavior of selected elements on a Strontium selective column

As already noted, safe clinical use of $^{90}Y$ requires the reduction of the $^{90}Sr$ level by a factor of $>10^6$. In addition, the yttrium must be separated from any trace elements which could interfere in the antibody labeling process. Because this process often involves the chelation of the $^{90}Y$ with diethylenetriaminepentaacetic acid (DTPA) conjugated to monoclonal antibodies, those elements having chelate formation constants with DTPA within several orders of magnitude of that of yttrium (for which log $K_f$=22.05) are of particular concern (See Table 1).

TABLE 1

| Formation Constants ($K_f$) for DTPA Chelates of several Trace Elements | |
|---|---|
| Element | Log $K_f$ |
| Fe | 27.5 |
| Ni | 20.0 |
| Cu | 20.5 |
| Zn | 18.0 |
| Y | 22.0 |
| Hg | 27.0 |
| Pb | 18.9 |

Table 2 summarizes the elution behavior of these elements on the Sr•Spec column, along with that of Sr, Y and Zr. Also included are a number of other elements which might be encountered in the fission product solutions used as $^{90}Sr$ feedstock and several elements considered likely to be retained by the Sr•Spec column on the basis of available thermodynamic data for cation interaction with 18-crown-6 based macrocycles. As can be seen, with the exception of barium, mercury, lead and strontium, each of the test elements is essentially unretained by the column. Each, in fact, can be completely eluted with 10 free column volumes (FCV) or less of 3 M HNO$_3$. Although barium and mercury are more strongly retained by the column, their elution too is virtually complete by the start of strontium elution. It should be noted that the choice of 30 free column volumes of rinsing before Sr stripping is entirely arbitrary. Nearly twice this volume of 3 M HNO$_3$[−50 FCV] may be passed through the column before strontium breakthrough occurs. Thus, mercury can be completely eliminated from the strontium fraction. Lead is strongly sorbed by the Sr•Spec resin and under identical conditions, distribution ratios of lead between the resin and nitric acid are an order of magnitude or more larger than the corresponding values for strontium. Lead and strontium are readily separated, however, simply by eluting the Sr with −10 FCV of dilute (e.g. 0.05 M) HNO$_3$ immediately after the 3 M HNO$_3$ rinses. Under these conditions, lead remains strongly sorbed. This sorbed lead may be removed from the column using dilute (0.1 M) sulfuric acid or ammonium oxalate solution.

TABLE 2

Elution behavior of selected elements of a SR.Spec column*, †

| Element | 3M HNO$_3$ | | | | | | 0.05 M |
|---|---|---|---|---|---|---|---|
| | 1–5 | 6–10 | 11–15 | 16–20 | 21–25 | 26–30 | 31–40 |
| Li | 100 | — | — | — | — | — | — |
| Na | 100 | — | — | — | — | — | — |
| Mg | 100 | — | — | — | — | — | — |
| Al | 100 | — | — | — | — | — | — |
| K | 65.8 | 35.3 | — | — | — | — | — |
| Ca | 98.7 | <1.0 | <1.0 | — | — | — | — |
| Mn | 100 | — | — | — | — | — | — |
| Fe | 100 | — | — | — | — | — | — |
| Co | 99.9 | — | — | — | — | — | — |
| Ni | 100 | — | — | — | — | — | — |
| Cu | 100 | 0.2 | — | — | — | — | — |
| Zn | 100 | 0.2 | — | — | — | — | — |
| Rb | 100 | — | — | — | — | — | — |
| Y | 98.5 | 0.1 | — | — | — | — | — |
| Zr | 91.2 | 0.4 | — | — | — | — | — |
| Ag | 15 | 87.6 | — | — | — | — | — |
| Cd | 100 | — | — | — | — | — | — |
| Cs | 100 | — | — | — | — | — | — |
| Ba | <0.4 | <0.4 | 52.9 | 41.6 | 5.9 | 0.7 | — |
| Hg | (6.0) | (5.6) | (18.8) | 45.3 | 19.6 | 14.1 | (6.9) |
| Pb | — | — | — | — | — | — | — |
| Bi | 100 | — | — | — | — | — | — |
| Sr | — | — | — | — | — | — | 99 |

*Sample, 3MHNO$_3$ containing the indicated elements; V$_{sample}$ = 600 μL. Column parameters, 1.0 cm$^3$ bed volume; 50–100 μm particle size resin; flow rate = 1mLcm$^{-2}$min$^{-1}$.

† Because of errors inherent in the ICP-AES method used for quantitation, the fractions shown for a given element may not total 100%. Values in parentheses are subject to considerable uncertainty and are intended only as a guide.

That strontium may be efficiently separated from any of the test elements is further demonstrated by the results presented in Table 3, which shows the decontamination factors achievable with the Sr•Spec column. A decontamination factor is the ratio of the concentration of the test element in the feed stock introduced to the column to the concentration of the same element in the fraction of interest, here the strontium fraction. Larger values of this factor indicate a more complete separation of strontium from the test element, this is, more efficient decontamination of the strontium fraction. As can be seen, the decontamination factors observed are typically quite large.

TABLE 3

| Decontamination factors for selected elements on a SR.Spec Column* | |
|---|---|
| Element | Decontamination factor |
| Li | >76 |
| Na | >80,000 |
| Mg | >700 |
| Al | >100 |
| K | (>75) |
| Ca | >100,000 + |
| Mn | >4700 |
| Fe | >2700 |
| Co | >1100 |
| Ni | >1100 |
| Cu | >3100 |
| Zn | >1300 |
| Rb | >2200 |
| Y | >2600 |
| Zr | >1800 |
| Ru | >40 |
| Rh | >10 |
| Pd | >11 |
| Ag | >2000 |
| Cd | >5600 |
| Cs | >330,000 |
| Ba | >500 |
| Hg | >(58) |
| Pb | >570 |

TABLE 3-continued

Decontamination factors for selected elements on a SR.Spec Column* +

| Element | Decontamination factor |
|---------|------------------------|
| Bi      | >470                   |

*All conditions as described in Table 2.
+ For values bearing a > sign, the measured concentration in the strontium fraction was at or below 3 X the limit of detection for the element (ICP) or with 2σ of the background (radiometric).
♣ Determined radiometrically.

With regard to the preparation of highly pure $^{90}$Y, these results are significant for two reasons. First, they indicate that the purity of the $^{90}$Sr feed solution (and, therefore, that of the $^{90}$Y product) should actually improve with each use of the process. That is, after the initial treatment of a given feed stock solution on the Sr•Spec columns, it is the strip fraction from these columns which becomes the feed for the next run (see Table 2). This fraction is, as these results show, significantly purer than was the original feed. In addition, the strong strontium sorption by the Sr•Spec column indicates that passage of the feed through the column should dramatically reduce the strontium content of the yttrium fraction. Indeed, in experiments using $^{85}$Sr tracer, decontamination factors (here, referring to the ratio of $^{85}$Sr in the feed to its concentration in the yttrium fraction) of $10^3$ or more are typically observed with a single column. Thus, three columns operating in series as shown in FIG. 1 would be expected to yield a total decontamination factor approaching $10^9$.

Elution behavior of selected elements on a RE•Spec column

Figure 2:
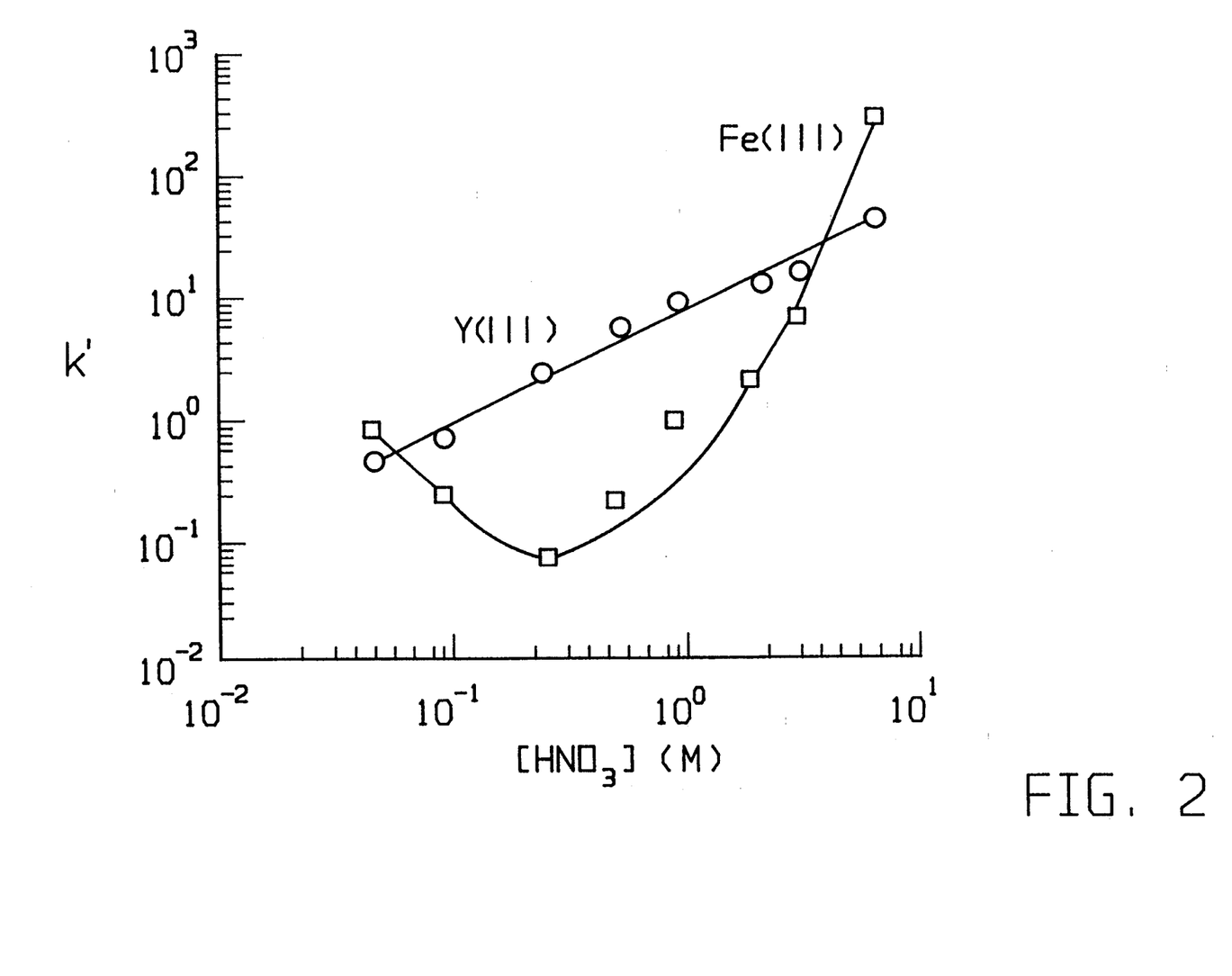
FIG. 2 shows a graphical representation of nitric acid dependencies of the retention of yttrium (III) and iron (III) on the rare-earth Selective chromatographic resin.

Table 4 summarizes the elution behavior of each of the test elements on a RE•Spec column. The conditions chosen for this experiment (i.e. 2M HNO$_3$ as the eluent and <2-FCV fractions early in the run) were suggested by preliminary studies which showed iron to be the principal impurity encountered throughout the process. As shown in FIG. 2, the apparent selectivity of the RE•Spec resin for $Y^{3+}$ over $Fe^{3+}$ is at a maximum at 0.2-0.5 M HNO$_3$. However, at such low acidities, yttrium retention is quite poor, with <6 FCV required to reach peak maximum (implying almost immediate breakthrough). Therefore, an acidity was chosen at which yttrium was more strongly retained (k'>10), yet iron retention had not yet become significant. As can be seen from the table, under these conditions, elution of most of the elements, including strontium, is complete in 4 FCV or less. Although iron is somewhat more strongly retained, its elution is nearly 99% complete after only 8 free column volumes. Yttrium breakthrough occurs at 7-8 FCV, with the yttrium concentration in the effluent reaching a maximum at ~12 FCV. Its elution is complete by 18 FCV. Several of the test elements, most notably Bi and Zr, are more strongly retained than is yttrium by the RE•Spec column. In each case, however, elution of yttrium is essentially complete before appreciable breakthrough of the element occurs.

TABLE 4

Elution behavior of selected elements of a RE.Spec column*, +

| | Portion eluting (%) in each fraction | | | | | | | | | |
|---|---|---|---|---|---|---|---|---|---|---|
| | 2M HNO$_3$ | | | | | | | | | 0.05 M |
| Element | 1 | 2 | 3 | 4 | 5 | 6 | 7 | 8 | 9 | 10 |
| Li | 79.3 | 27.8 | — | — | — | — | — | — | — | — |
| Na | 74.7 | 30.5 | — | — | — | — | — | — | — | — |
| Mg | 78.5 | 28.3 | — | — | — | — | — | — | — | — |
| Al | 79.4 | 26.8 | — | — | — | — | — | — | — | — |
| K  | 81.8 | 27.3 | — | — | — | — | — | — | — | — |
| Ca | 75.3 | 33.7 | — | — | — | — | — | — | — | — |
| Mn | 45.8 | 61.2 | — | — | — | — | — | — | — | — |
| Fe | <0.5 | 53.4 | 44.9 | 2.2 | <1.1 | — | — | — | — | — |
| Co | 75.0 | 30.3 | — | — | — | — | — | — | — | — |
| Ni | 77.3 | 28.2 | — | — | — | — | — | — | — | — |
| Cu | 76.4 | 30.1 | — | — | — | — | — | — | — | — |
| Zn | 77.2 | 30.2 | — | — | — | — | — | — | — | — |
| Rb | 75.9 | 27.2 | — | — | — | — | — | — | — | — |
| Sr | 78.8 | 28.9 | — | — | — | — | — | — | — | — |
| Zr | 1.4  | 1.1  | 0.3 | — | — | — | — | — | — | 76.0 |
| Ag | 82.0 | 17.9 | — | — | — | — | — | — | — | — |
| Cd | 72.6 | 34.2 | — | — | — | — | — | — | — | — |
| Cs | 74.8 | 27.0 | — | — | — | — | — | — | — | — |
| Ba | 79.9 | 27.2 | — | — | — | — | — | — | — | — |
| Hg | 47.5 | 51.2 | — | — | — | — | — | — | — | — |
| Pb | 63.0 | 41.9 | — | — | — | — | — | — | — | — |
| Bi | —   | —   | — | — | — | — | — | — | — | 7.8 |
| Y  | —   | —   | — | 3.8 | 20.8 | 30.3 | 28.9 | 8.3 | 1.8 | <1.0 |

*Fractions 1–6 correspond to 1.8 FCV each, fractions 7 and 8 to 3.6 FCV each, and fractions 9 and 10 to 9.0 FCV each.
+ All other conditions are as described in Table 2, except that the sample is in 2M HNO$_3$. Also, ~6 × 10$^{-3}$ M oxalic acid is present in the sample solution to solubilize zirconium.

TABLE 5

Decontamination factors for selected elements on a RE.Spec Column*, +

| Element | Decontamination factor + |
|---------|--------------------------|
| Li | >48 |
| Na | >79 |
| Mg | >360 |
| Al | >70 |
| K  | (>10) |
| Ca | >600 |
| Mn | >2500 |
| Fe | 180 |
| Co | >770 |
| Ni | >770 |
| Cu | >1700 |
| Zn | >1740 |
| Rb | >580 |
| Sr | >3900 |
| Zr | >1040 |
| Ag | >1390 |
| Cd | >2970 |
| Cs | >1000 |

TABLE 5-continued

Decontamination factors for selected elements on a RE.Spec Column*, +

| Element | Decontamination factor |
|---|---|
| Ba | >350 |
| Hg | (>20) |
| Pb | >370 |
| Bi | >220 |

*All conditions as described in Table 4.
+ Based on the measured concentrations in fraction (5), the fraction after yttrium breakthrough occurs.

Product purity/radiolabeling efficiency

The radiochemical purity of the $^{90}$Y product is determined by a combination of the decontamination from $^{90}$Sr achieved with the series of Sr•Spec columns and that obtained with the RE•Spec column. The measured overall reduction in the $^{90}$Sr level so obtained, a factor $>4.5\times10^8$, compares favorably to that observed for previously described generator systems.

The chemical purity of the product, that is the absence of appreciable mounts of cations capable of competing with yttrium for binding sites on an antibody, is indicated by the results of antibody labeling studies. An average of 95% incorporation was observed, a value comparable to or higher than results obtained with $^{90}$Y produced by other purification schemes.

Radiolytic stability of Sr•Spec and RE•Spec resin

Several of the $^{90}$Y generator systems previously proposed have been plagued by radiolytic degradation of the resin or extractant used in the separation of $^{90}$Y from $^{90}$Sr. Earlier work at Argonne has demonstrated that the SREX and TRUEX extraction process solvents, upon which the Sr•Spec and Re.Spec resins used here are based, exhibit reasonably good radiation stability. Nonetheless, because the resins employ modifications of these process solvents and because of the lack of information regarding the radiolytic stability of the support material, the effect of irradiation upon the elution behavior of selected elements on the resins was examined.

Figure 3:
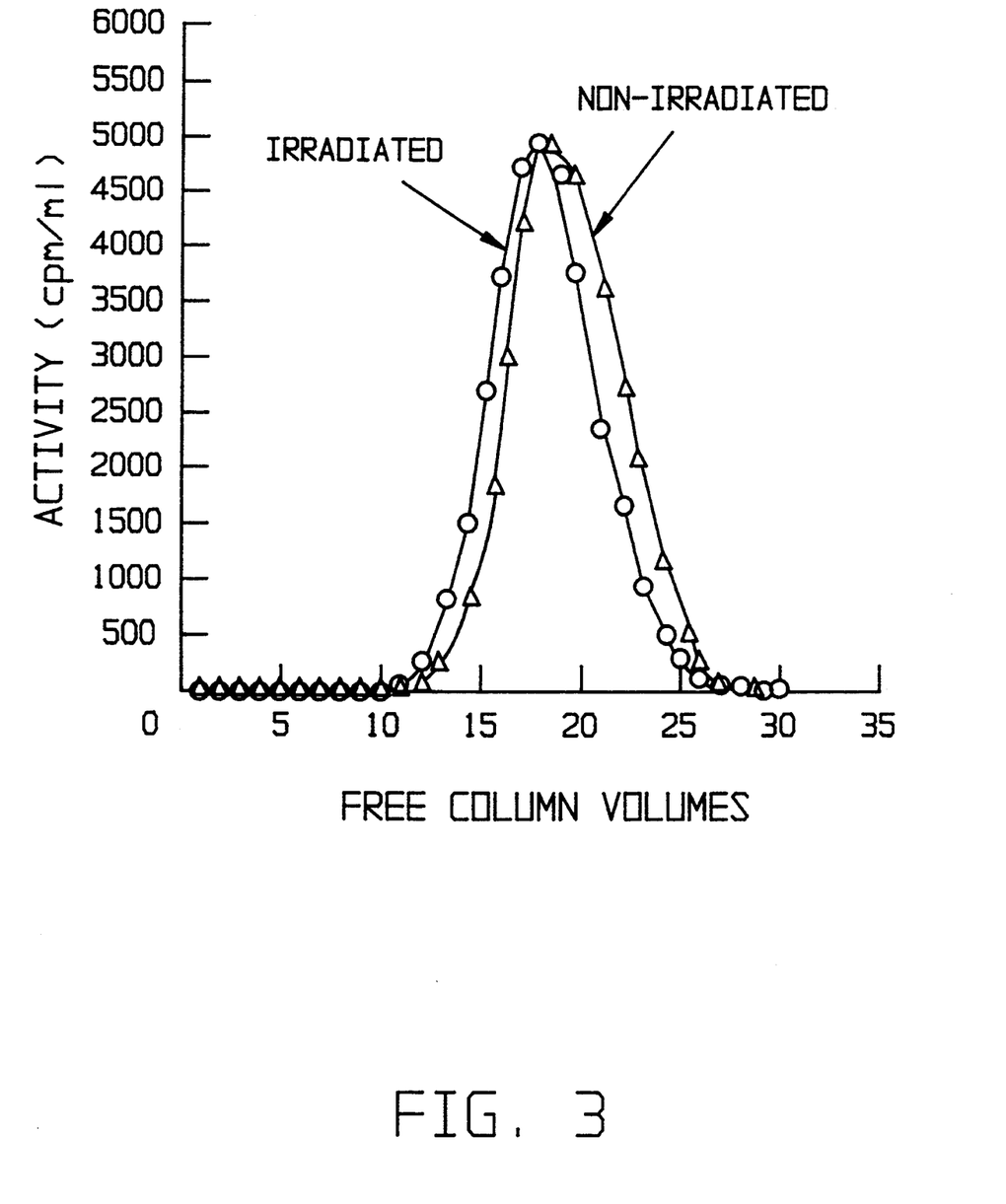
FIG. 3 shows the effect of resin irradiation on the elution behavior of yttrium-90 on a rare-earth selective column.
Figure 4:
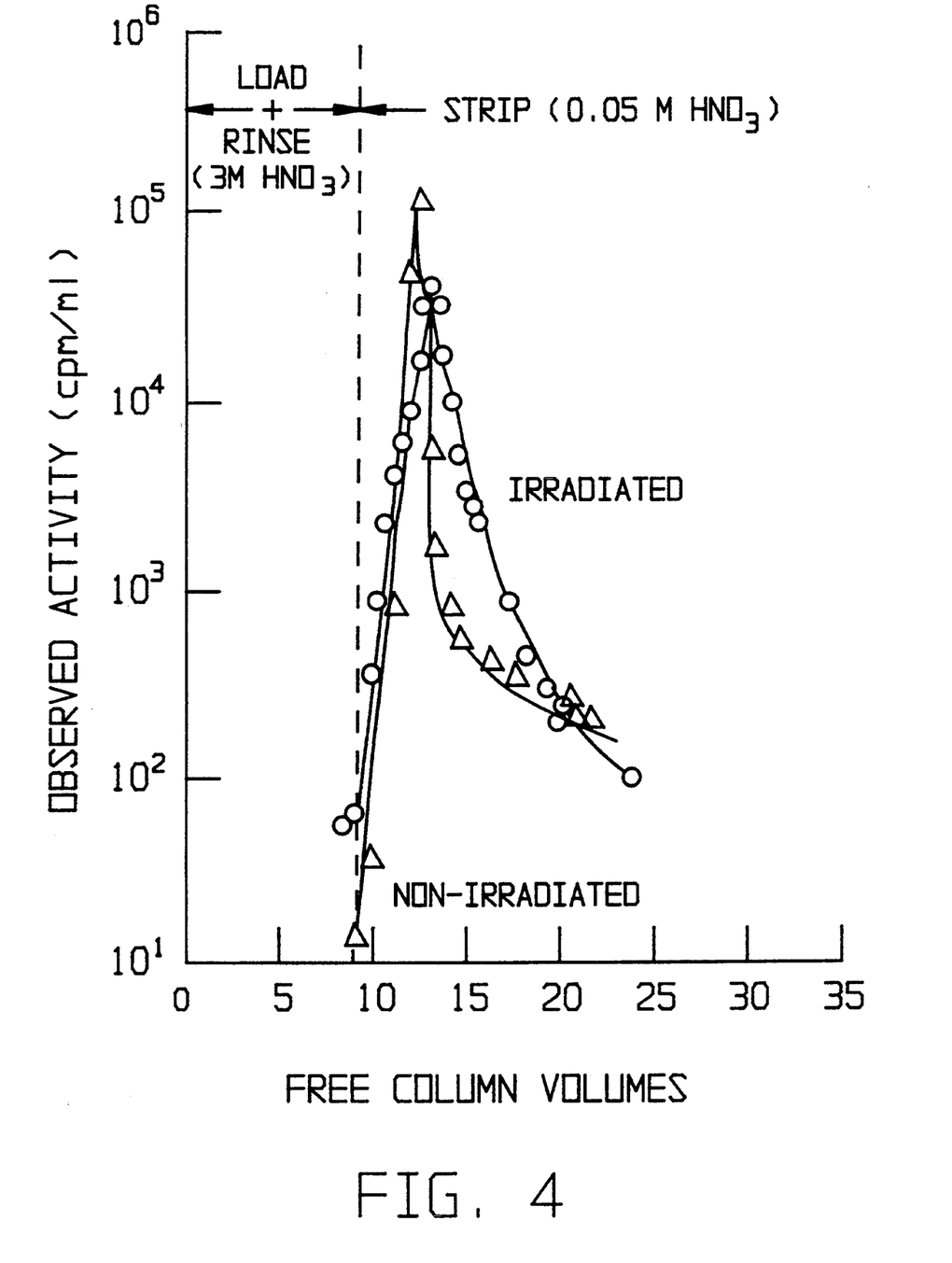
FIG. 4 shows the effect of resin irradiation on the stripping of strontium from a strontium-selective column; and, FIG. 5 shows the effect of resin irradiation on the retention of strontium by a strontium-selective column.
Figure 5:
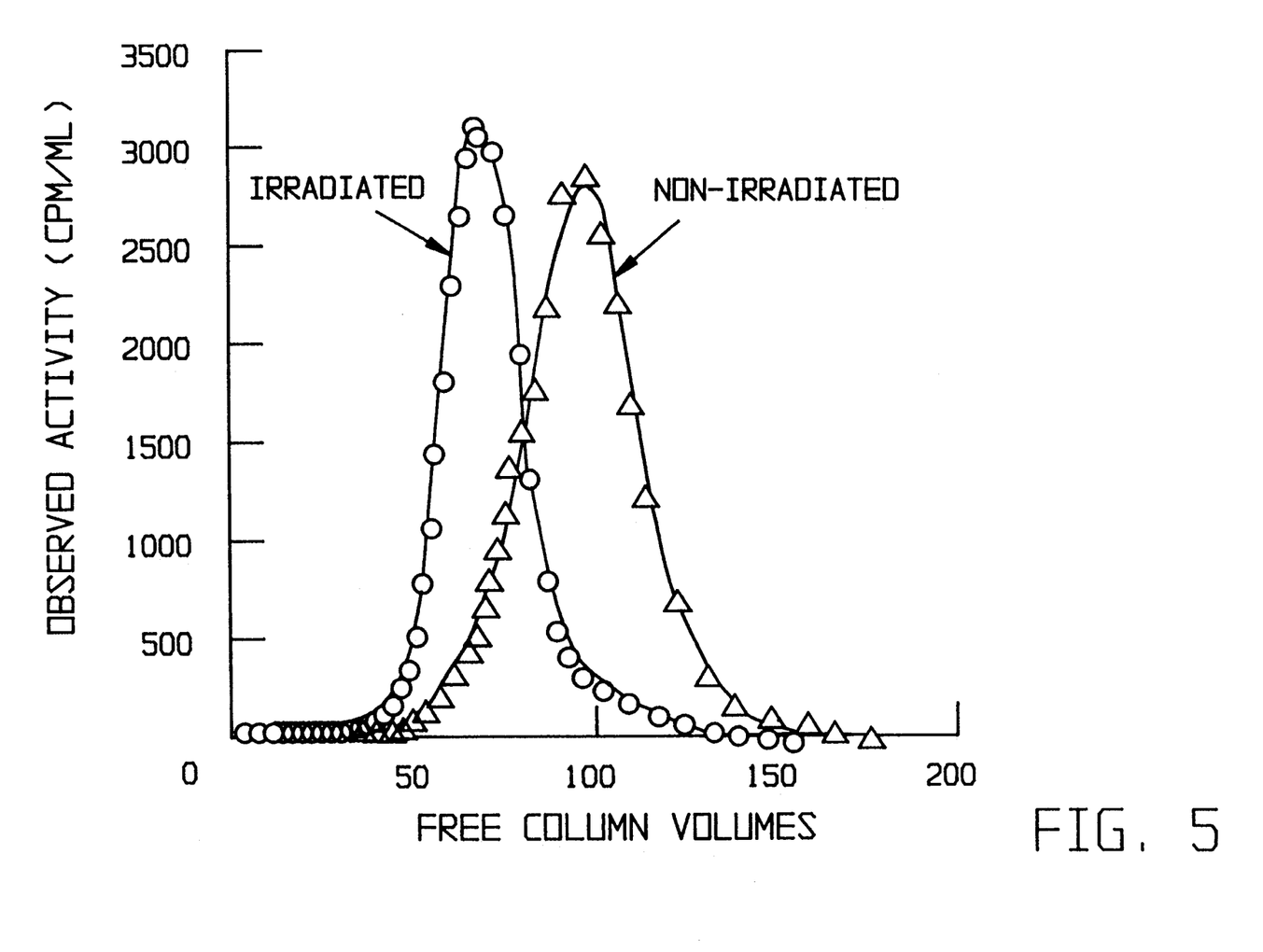

Table 6 shows the effect of increasing doses of $^{60}$Co γ radiation upon the distribution ratios of $^{85}$Sr and $^{241}$Am (the latter chosen as a convenient gamma-emitting "stand in" for $^{90}$Y) between nitric acid solutions and the Sr•Spec and RE Spec resins, respectively. Over the range of absorbed doses considered, americium distribution ratios on RE•Spec are altered only slightly by irradiation, implying that yttrium elution should not be greatly affected. This is confirmed by the results presented in FIG. 3, which shows the elution profile for $^{90}$Y on RE•Spec columns prepared from both irradiated and nonirradiated resins. As can be seen, the elution profiles are nearly indistinguishable. This is not entirely unexpected, given the good radiation stability of the corresponding liquid-liquid system, noted above. The stripping of sorbed strontium from Sr•Spec with dilute acid is also largely unaffected by irradiation (FIG. 4). It should be noted, however, that stripping with pure water becomes much more difficult upon radiolysis. As shown in FIG. 5, however, strontium retention is adversely affected at sufficiently high levels of $^{60}$Co exposure. Specifically, $3.6\times10^7$ rads γ irradiation results in a shift in the peak maximum from −97 FCV to 67 FCV. Curiously, the peak width (at half maximum) is considerably narrower with the irradiated resin. As a result, despite the sizeable drop in the elution volume to peak maximum, the breakthrough volume is not significantly lower for the irradiated material. The reason for this observation remains unclear at present. Additional studies of the radiolytic degradation of Sr•Spec are clearly warranted.

TABLE 6

Effect of radiolysis upon the uptake of strontium and americium by SR.SPEC and RE.Spec resins, respectively*

| Radiation Dose (rads) | $D_w$ | | | |
|---|---|---|---|---|
| | SR.SPEC | | RE.Spec | |
| | Low Acid | High Acid | Low Acid | High Acid |
| 0 | 2.34 | 248 | 8.38 | 287 |
| $4.5\times10^6$ | 2.59 | 254 | 6.32 | 260 |
| $9.0\times10^6$ | 2.51 | 236 | 6.37 | 265 |
| $1.8\times10^7$ | 3.32 | 232 | 7.57 | 258 |
| $3.6\times10^7$ | 3.56 | 249 | 9.47 | 253 |

*Conditions: ~100 mg of indicated resin plus 2.00 mL of 0.05 M HNO$_3$ (for all "low acids" measurements), 2 M HNO$_3$ (RE.Spec, "high acid" measurements), or 3 M HNO$_3$ (Sr.Spec, "high acid" measurements), $^{241}$Am or $^{85}$Sr tracers.
Calculated from the equation:

$$D_w = \left(\frac{A_0 - A_s}{w}\right)/\left(\frac{A_s}{V_{aq}}\right)$$

where $A_0$ and $A_s$ represent the activity of the aqueous phase before and after equilibration with the resin, respectively, w is the weight of resin taken, and $V_{aq}$ is the volume of aqueous phase. The number of free column volumes to peak maximun (k') is obtained by dividing $D_w$ by 2.19 and 1.85 for Sr.Spec and RE.Spec, respectively.

$^{90}$Y can be conveniently and efficiently separated from $^{90}$Sr by extraction chromatography using a combination of Sr-selective and rare earth-selective chromatographic resins. The $^{90}$Y product obtained is of extremely high chemical and radiochemical purity. No trace elements are present at levels capable of impeding antibody labeling. Strontium-90 decontamination factors approaching $10^9$ are achievable.

Because the $^{90}$Sr is removed from the chromatographic columns and stored either as a solution or as a solid between rum and because the extractants used exhibit reasonably good radiolytic stability, rapid deterioration of the resins is not observed, making their frequent replacement unnecessary. Also, because the $^{90}$Sr stock is repurified each time that $^{90}$Y is recovered, radiolytic and chemical impurities do not accumulate in the stock solution, reducing the frequency with which it must be replaced. Thus, the volume of waste generated by the process is minimized.

The foregoing description of preferred embodiments of the invention has been presented for purposes of illustration and description. It is not intended to be exhaustive or to limit the invention to the precise form disclosed, and obviously many modifications and variations are possible in light of the above teaching. For example, the data from Tables 2 and 4 suggest that other radionuclides of possible interest in nuclear medicine could be prepared using the extraction resins described herein, although modification of the columnar configuration might be necessary. More particularly, the data in Table 2 shows that it is possible to produce $^{82}$Rb from $^{82}$Sr. The embodiments were chosen and described to best explain the principles of the invention and its practical application and thereby enable others skilled in the an to best utilize the invention in various embodiments and with various modifications as are suited to the particular use contemplated. It is intended that the scope of the invention be defined by the claims appended hereto.

The embodiments of the invention in which an exclusive property of privilege is claimed are defined as follows:

1. A process for the separation and purification of yttrium-90 from strontium-90 comprising:
   a) purifying an original $^{90}$Sr solution by dissolving the residue remaining after evaporation of the original solution in nitric acid and passing it through a strontium-selective chromatographic column;
   b) stripping sorbed $^{90}$Sr with dilute nitric acid;
   c) removing any traces of organic materials present in the purified $^{90}$Sr by passing it through a bed of a polymeric sorbent;
   d) storing the $^{90}$Sr solution for a sufficient period of time to allow $^{90}$Y ingrowth to occur in the solution to provide a $^{90}$Sr/$^{90}$Y mixture;
   e) acidifying the $^{90}$Sr/$^{90}$Y mixture and passing the mixture through a series of strontium-selective extractant columns such that essentially all of the $^{90}$Sr is retained on the columns and the effluent from the third column contains essentially only $^{90}$Y;
   f) passing the $^{90}$Y effluent through a rare-earth selective extractant such that $^{90}$Y is retained while any residual $^{90}$Sr is stripped away;
   g) eluting sorbed $^{90}$Y from the rare-earth selective column;
   h) stripping each of the strontium-selective extractant columns of sorbed $^{90}$Sr with dilute nitric acid and returning to storage to allow for new $^{90}$Y growth.

2. The process of claim 1 wherein the strontium selective extractant resin is obtained from an octanol solution of di-t-butylcyclohexano-18-crown-6.

3. The process of claim 2 wherein the yttrium-selective extractant is obtained from a solution of octyl(phenyl)-N,N-diisobutylcarbamoylmethylphosphine oxide in tributylphosphate.

4. A process for the separation and purification of curie quantities of yttrium-90 from strontium-90 comprising:
   a) contacting an original feed stock strontium-90 solution with a strontium-selective extraction chromatographic resin whereby purified strontium is retained, and any yttrium and zirconium present in the solution are flushed away;
   b) removing any traces of organic materials from the purified strontium solution and storing this solution for a sufficient period of time to allow yttrium-90 ingrowth to occur so that a strontium-90/yttrium-90 mixture is obtained;
   c) acidifying the strontium-90/yttrium-90 mixture and selectively separating the strontium-90 from the yttrium-90 by contacting the mixture with a series of strontium- selective extraction columns such that strontium is retained on the columns and that the effluent from the last column contains only yttrium-90;
   d) contacting the yttrium-90 containing effluent with a rare-earth selective extraction column such that yttrium-90 is retained and any residual strontium-90 is not retained;
   e) eluting the sorbed yttrium-90 from the rare-earth selective column.

5. The process of claim 1 wherein the strontium-90 feed stock contains up to 3 molar nitric acid.

6. The process of claim 5 wherein the strontium-selective extraction resin includes an octanol solution of di-t-butylcyclohexano-18-crown-6.

7. The process of claim 6 wherein the rare-earth selective extraction resin includes octyl(phenyl)-N,N-diisobutylcarbamoylmethylphosphine oxide in tributylphosphate.

8. The process of claim 7 including the step of stripping sorbed strontium-90 from the strontium-selective columns with a dilute acid and returning to storage to allow for new yttrium-90 ingrowth.

* * * * *